United States Patent
Grau Sorarrain et al.

(10) Patent No.: US 9,991,765 B2
(45) Date of Patent: Jun. 5, 2018

(54) COOLING DEVICE FOR AN ELECTRIC MOTOR

(71) Applicant: Siemens Aktiengesellschaft, Munich (DE)

(72) Inventors: Esteban Grau Sorarrain, Dusseldorf (DE); Christian Jäkel, Duisburg (DE); Mario Koebe, Mulheim an der Ruhr (DE); Matthias Kowalski, Mulheim an der Ruhr (DE); Christoph Lehmann, Neukirchen-Vluyn (DE); Andrey Mashkin, Cologne (DE); Olga Plotnikova, Wuppertal (DE); Carolin Schild, Mulheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 15/021,690

(22) PCT Filed: Sep. 3, 2014

(86) PCT No.: PCT/EP2014/068695
§ 371 (c)(1),
(2) Date: Mar. 12, 2016

(87) PCT Pub. No.: WO2015/043896
PCT Pub. Date: Apr. 2, 2015

(65) Prior Publication Data
US 2016/0226345 A1    Aug. 4, 2016

(30) Foreign Application Priority Data
Sep. 25, 2013   (EP) ..................................... 13185971

(51) Int. Cl.
*H02K 9/20*    (2006.01)
*F28D 15/02*   (2006.01)

(52) U.S. Cl.
CPC ............... *H02K 9/20* (2013.01); *F28D 15/02* (2013.01); *F28D 15/0275* (2013.01); *F28D 15/0283* (2013.01)

(58) Field of Classification Search
CPC .. F28D 15/02; F28D 15/0275; F28D 15/0283; H02K 9/20
(Continued)

(56) References Cited

U.S. PATENT DOCUMENTS

| 3,801,843 A | * | 4/1974 | Corman | .............. F28D 15/0275 165/104.25 |
| 6,091,168 A | * | 7/2000 | Halsey | ..................... H02K 1/24 310/166 |

(Continued)

FOREIGN PATENT DOCUMENTS

| CN | 102738919 A | 10/2012 |
| CN | 103283129 A | 9/2013 |

(Continued)

OTHER PUBLICATIONS

JP Office Action dated Feb. 13, 2017, for JP patent application No. 2016-516831.

(Continued)

*Primary Examiner* — Alex W Mok
(74) *Attorney, Agent, or Firm* — Beusse Wolter Sanks & Maire

(57) ABSTRACT

A cooling device for an electric motor includes at least one closed capillary tube, within which a cooling fluid is located and which is introduced into an opening of a lamination stack of the electric motor such that the capillary tube is connected to the lamination stack to conduct heat and partially projects out of the lamination stack, such that the capillary tube has a cold end disposed outside and a hot end disposed inside the lamination stack. The cooling fluid and (Continued)

the degree of filling of the capillary tube with the cooling fluid is chosen such that an input of heat from the lamination stack into the capillary tube leads to evaporation of the cooling fluid, and the cold end of the capillary tube is cooled such that vapor produced during the evaporation condenses and heat input into the capillary tube is dissipated out of the capillary tube.

11 Claims, 2 Drawing Sheets

(58) Field of Classification Search
USPC .......................................................... 310/54
See application file for complete search history.

(56) References Cited

U.S. PATENT DOCUMENTS

| | | | | |
|---|---|---|---|---|
| 7,635,932 B2* | 12/2009 | Matin | ............... | H02K 9/20 310/58 |
| 8,952,582 B2* | 2/2015 | Le Besnerais | ........... | H02K 9/02 310/52 |
| 2004/0155539 A1* | 8/2004 | Potoradi | ............... | F28D 15/02 310/58 |
| 2008/0067882 A1* | 3/2008 | Murata | ............... | H02K 9/19 310/54 |
| 2010/0072854 A1* | 3/2010 | Stiesdal | ............... | H02K 1/187 310/216.113 |
| 2012/0256502 A1* | 10/2012 | Le Besnerais | ........... | H02K 9/02 310/54 |
| 2013/0270939 A1 | 10/2013 | Brandl et al. | | |

FOREIGN PATENT DOCUMENTS

| | | |
|---|---|---|
| EP | 2509196 A1 | 10/2012 |
| JP | S51026070 | 9/1977 |
| JP | S52118905 U1 | 9/1977 |
| JP | S53071846 U | 12/1979 |
| JP | S54173253 U | 12/1979 |
| JP | S5912501 | 8/1985 |
| JP | S60124269 U | 8/1985 |
| JP | H03186195 A | 8/1991 |
| WO | 2006077188 A1 | 7/2006 |
| WO | 2010050011 A1 | 5/2010 |

OTHER PUBLICATIONS

CN Office Action dated Jul. 25, 2017, for CN patent application No. 201480053349.X.

* cited by examiner

COOLING DEVICE FOR AN ELECTRIC MOTOR

CROSS REFERENCE TO RELATED APPLICATIONS

This application is the US National Stage of International Application No. PCT/EP2014/068695 filed Sep. 3, 2014, and claims the benefit thereof. The International Application claims the benefit of European Application No. EP13185971 filed Sep. 25, 2013. All of the applications are incorporated by reference herein in their entirety.

FIELD OF INVENTION

The invention relates to a cooling device for an electrical machine and to an electrical machine with the cooling device.

BACKGROUND OF INVENTION

In an electrical machine, such as for example a motor or a generator, electrical energy is converted into rotational energy or rotational energy is converted into electrical energy. The electrical machine has a rotor and a stator, the stator having a laminated core, in which electrical connectors are placed and configured as a winding. In order to insulate the conductors electrically from one another, from the environment and from the laminated core, the electrical conductors are enclosed by a main insulation. During the operation of the electrical machine, the conductors heat up as a result of the electrical currents flowing in them. The heat released in the conductors is also transferred to the main insulation and the laminated core by thermal conduction.

Because thermal decomposition of the main insulation occurs after a maximum permissible temperature is exceeded, a limitation of the temperature of the electrical machine to the maximum permissible temperature is required. After advanced decomposition, a dielectric breakdown may occur through the main insulation, which leads to a shortening of the service life of the electrical machine. In order to prevent the maximum permissible temperature from being exceeded, the laminated core is conventionally provided with cooling ducts, through which a gas, such as for example air or hydrogen, is made to flow during the operation of the electrical machine in order to cool the laminated core. However, it is disadvantageous that this only allows heat to be removed from the laminated core with low heat flow densities. The maximum power with which the electrical machine can be operated is limited by the heat that can be removed from the laminated core.

SUMMARY OF INVENTION

The object of the invention is to provide a cooling device for an electrical machine and an electrical machine with the cooling device, the cooling device allowing high heat flow densities to be removed from the laminated core.

The cooling device according to the invention for an electrical machine has at least one closed-off capillary, within which there is a cooling fluid and which is incorporated in a clearance in a laminated core of the electrical machine in such a way that the capillary is connected to the laminated core in a heat-conducting manner and partially protrudes out of the laminated core, so that the capillary has a cold end, arranged outside the laminated core, and a warm end, arranged within the laminated core, wherein the cooling fluid, the thermodynamic state point of the cooling fluid and the degree of filling of the capillary with the cooling fluid are chosen such that, during the operation of the electrical machine, an introduction of heat from the laminated core into the capillary leads to an evaporation of the cooling fluid and the cold end of the capillary can be cooled in such a way that the vapor occurring during the evaporation condenses and the heat introduced into the capillary can be removed from the capillary.

The degree of filling of the capillary with the cooling fluid is chosen such that the molar volume of the cooling fluid in the capillary is substantially the critical molar volume. Consequently, the cooling fluid is both liquid and gaseous over the widest possible pressure range, so that the cooling device also functions within the widest possible pressure range.

In the removal of the heat from the laminated core by means of the cooling device according to the invention, the enthalpy of evaporation and the enthalpy of condensation of the cooling fluid are used. As a result, the heat can be removed from the laminated core with a much higher heat flow density in comparison with a conventional cooling device, in which the heat is transferred to a gas. As a result, with a given length of the laminated core, the electrical machine can be operated with higher power. It is also possible with a given power of the electrical machine to make the laminated core shorter. It is also possible to retrofit an existing electrical machine with the cooling device according to the invention, so that the existing electrical machine can be operated with higher power.

It is advantageous that the cooling fluid and the material of the capillary are chosen such that the adhesion between the capillary and the cooling fluid is greater than the cohesion of the cooling fluid, and the capillary is made so thin that a circulatory flow of the cooling fluid establishes itself in the capillary during the operation of the electrical machine irrespective of any influence of gravitational force, the circulatory flow being formed in such a way that on the inner side of the capillary there forms a film of liquid, which moves substantially from the cold end to the warm end, and, enclosed by the film, the vapor moves substantially from the warm end to the cold end. As a result, it is advantageously ensured that the circulatory flow establishes itself irrespective of the orientation of the capillary. Thus, the cold end may be arranged above, below or in an identical horizontal plane to that of the warm end. The circulatory flow advantageously has a high mass flow, whereby the heat flow density with which the heat can be removed from the laminated core is also high.

The inside diameter of the capillary is in particular from 1 mm to 5 mm. With smaller diameters it is not possible that both a phase comprising the liquid and a phase comprising the vapor are present simultaneously in a cross section of the capillary. With a greater diameter, the capillary action is not sufficient for the liquid to move upward against the gravitational force in the case of a vertical orientation of the capillary, in which the cold end is arranged below the warm end.

The cooling device in particular has a liquid cooling, in particular a water cooling, by means of which the cold end of the capillary can be cooled. It is advantageous that the cooling device has a cooling rib, by means of which the cold end of the capillary can be cooled. In this case it is advantageous that the cooling ribs are gas-cooled. By means of the liquid cooling and/or cooling rib, it is advantageously ensured that the vapor in the region of the cold end condenses and the enthalpy of condensation released during the condensation is removed from the capillary.

Advantageously, the laminated core has grooves, which are arranged next to one another in the circumferential direction and in which electrical conductors are incorporated, and the warm end of the capillary is arranged between two adjacent grooves. Because the heat to be removed from the laminated core is released particularly in the electrical conductors, the region between two adjacent grooves is the hottest of the laminated core. Arranging the warm end of the capillary in this region advantageously means that the hottest region of the laminated core can be cooled with the cooling device according to the invention.

The cooling fluid is in particular water, an alcohol, in particular methanol, ethanol, propanol and/or butanol, and/ or an alkane, in particular propane, butane, pentane, hexane and/or heptane. The substances mentioned are advantageous because they have a great two-phase region, which means that they are both liquid and gaseous over a great pressure range and temperature range. Water and the alcohols are particularly advantageous, because they have a great enthalpy of evaporation. It is the case here that, with greater enthalpies of evaporation, the heat can be removed from the laminated core with greater heat flow densities.

It is advantageous that a plurality of capillaries are provided, distributed over the laminated core uniformly over the circumference and in the axial direction. This advantageously achieves the effect that the entire laminated core can be cooled uniformly.

The electrical machine according to the invention has the cooling device according to the invention. It is advantageous that the electrical machine is an electrical generator. Alternatively, it is advantageous that the electrical machine is an electric motor.

BRIEF DESCRIPTION OF THE DRAWINGS

The invention is explained in more detail below on the basis of the accompanying schematic drawings, in which.

DETAILED DESCRIPTION OF INVENTION

Figure 1:
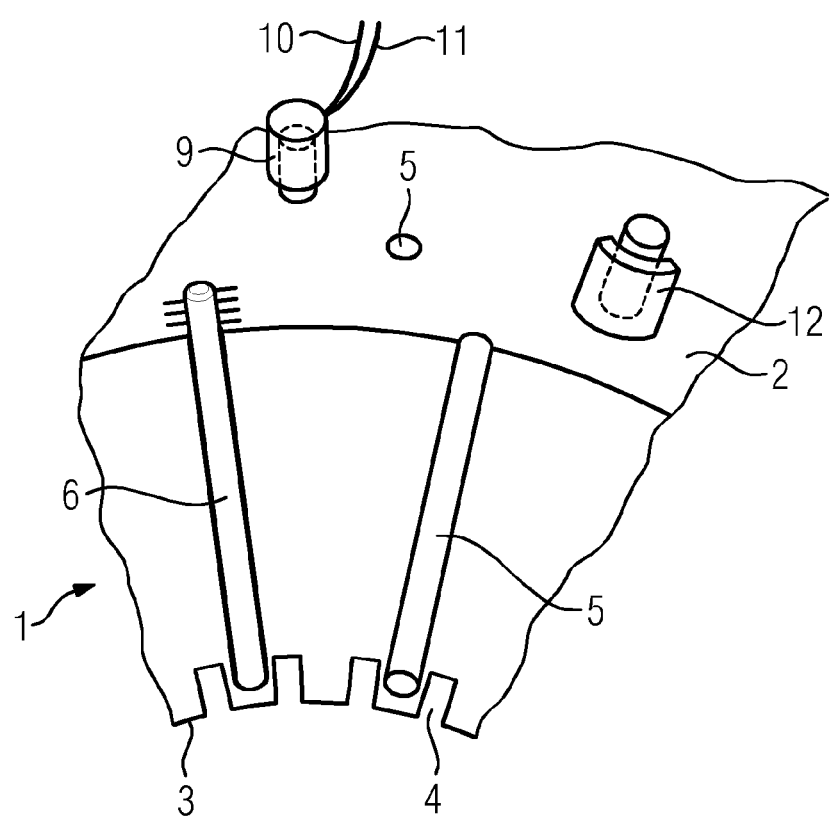
FIG. 1 shows a view of a laminated core with a cooling device.

As can be seen from FIG. 1, an electrical machine has an annular laminated core 1, only a cutout of the laminated core 1 being represented in FIG. 1. Incorporated on the radial inner side 3 of the laminated core 1 are grooves 4, which lie next to one another in the circumferential direction and extend substantially axially. Incorporated in the grooves 4 are electrical conductors, the electrical conductors being enclosed by a main insulation, so that the electrical conductors are electrically insulated from the laminated core 1. Arranged in the laminated core 1 are clearances 5, which extend from a region between two adjacent grooves 4 to the radial outer side 2 of the laminated core 1.

A capillary 6 is respectively incorporated in each of the clearances 5. The capillaries 6 are in this case in heat-conducting contact with the laminated core 1. In order to increase the thermal conductivity, it is possible for example for a thermally conducting paste to be incorporated between the laminated core 1 and the capillary 6. As FIG. 2 reveals, the capillary 6 comprises a cylindrical tube, the two ends of which are closed, so that the capillary 6 is closed off in such a way that no fluid can enter or leave the capillary 6. The capillary 6 is longer than the clearance 5, so that, when it is incorporated in the clearance 5, it has a cold end 8, which is arranged outside the laminated core 1, and a warm end 7, which is arranged within the laminated core 1. The warm end 7 is in this case arranged between two adjacent grooves 4.

During the operation of the electrical machine, the cold end 8 can be cooled, two different embodiments of the cooling being represented in FIG. 1. In a first embodiment, the cold end 8 is enclosed by a cap 9, connected to which are a cooling fluid supply line 10 and a cooling fluid discharge line 11. A cooling liquid, in particular water, is introduced via the cooling fluid supply line 10 into the cap 9, where the cooling fluid takes up heat from the capillary 6. The liquid warmed up in the cap 9 is discharged from the cap 9 via the cooling fluid discharge line 11. In a second embodiment, the cold end 8 is enclosed by a cooling rib 12. The cooling rib 12 may for example be cooled by means of an air flow.

Figure 2:
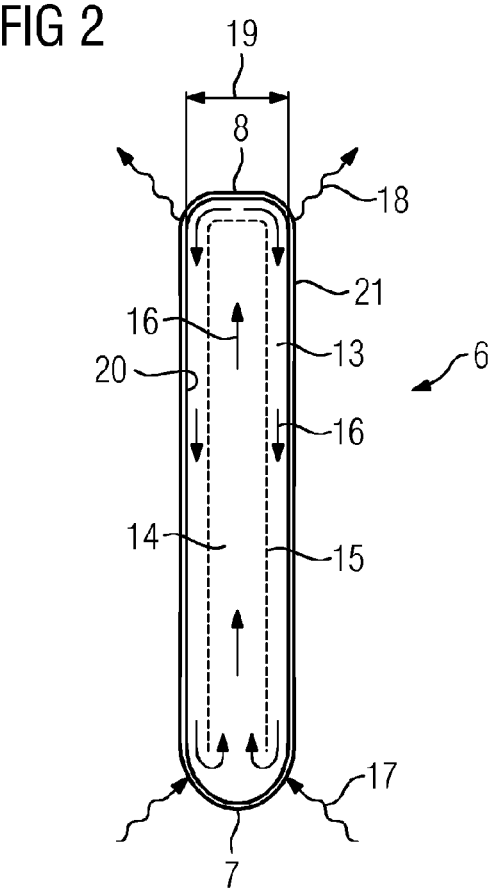
FIG. 2 shows a section through a capillary.

As can be seen from FIG. 2, the capillary 6 is filled with a cooling fluid, a circulatory flow of the cooling fluid within the capillary establishing itself during the operation of the electrical machine. For this purpose, the cooling fluid and the degree of filling of the capillary 6 with the cooling fluid must be chosen such that, during the operation of the electrical machine, the cooling fluid is present simultaneously both as a liquid 13 and as a vapor 14. The capillary action has the effect that the liquid 13 lies against the inner side 20 of the capillary 6. The liquid 13 consequently forms a substantially cylindrical ring. The vapor 14 is located inside this cylindrical ring, whereby a substantially cylindrical phase boundary 15 is formed between the liquid 13 and the vapor 14. An introduction of heat 17 from the laminated core 1 into the capillary 6 leads to an evaporation of the liquid 13. The capillary action has the effect that evaporated liquid is replaced by replenishing liquid, whereby a direction of flow 16 of the liquid from the cold end 8 to the warm end 7 is obtained. The vapor 14 is condensed at the cold end 8, whereby a direction of flow 16 of the vapor 14 from the warm end 7 to the cold end 8 is obtained. The cooling of the cold end 8 has the effect that a removal of heat 18 from the capillary 6 takes place.

Figure 3:
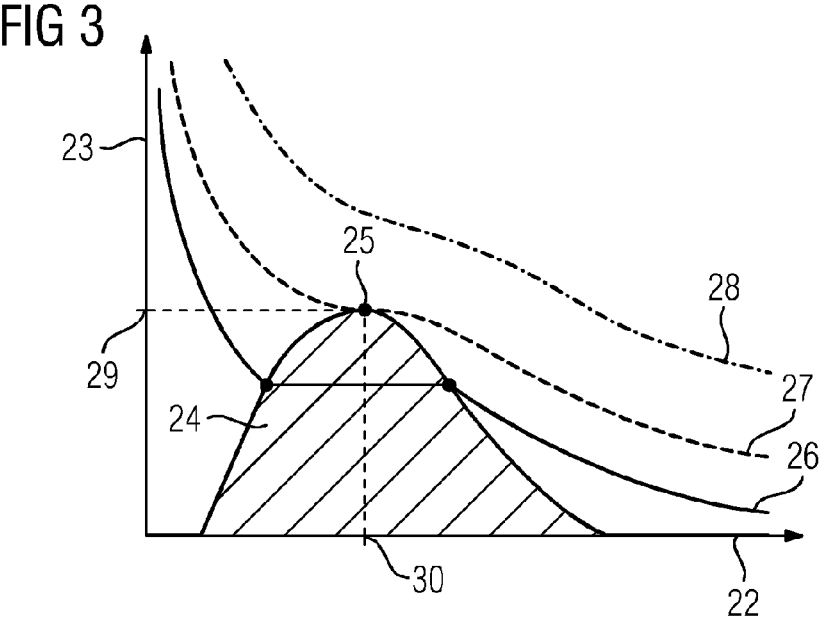
FIG. 3 shows a p$\bar{V}$ diagram of a cooling fluid.

In FIG. 3, a p$\bar{V}$ diagram of the cooling fluid is represented. The molar volume $\bar{V}$ of the cooling fluid is plotted on the x axis 22 and the pressure p of the cooling fluid is plotted on the y axis 23. A two-phase region 24, within which the cooling fluid is present both as a liquid 13 and as a vapor 14, is shown hatched in FIG. 3. Toward smaller molar volumes in relation to the two-phase region 24, the cooling fluid is present as a liquid 13; toward greater molar volumes in relation to the two-phase region 24, the cooling fluid is present as a vapor 14. The maximum of the two-phase region 24 is the critical point 25. Shown are a first isotherm 26, which extends through the two-phase region 24, a second isotherm 27, which passes through the critical point 25, and a third isotherm 28, which has a higher temperature than the critical isotherm. In order that an evaporation and condensation of the cooling fluid can take place, the cooling fluid must be within the two-phase region during the operation of the electrical machine. The degree of filling is accordingly to be chosen so as to obtain an isochor extending vertically thereto in the p$\bar{V}$ diagram, intersecting the two-phase region 24. It is advantageous in this case to choose the critical isochor, which intersects the critical point 25, so that the cooling fluid is in the two-phase region 24 over the widest possible pressure range.

Although the invention has been more specifically illustrated and described in detail by the preferred exemplary embodiments, the invention is not restricted by the disclosed examples and other variations can be derived herefrom by a person skilled in the art without departing from the scope of protection of the invention.

The invention claimed is:

1. An electrical machine comprising:
   a cooling device with at least one closed-off capillary, within which there is a cooling fluid and which is incorporated in a clearance in a laminated core of the electrical machine such that the capillary is connected to the laminated core in a heat-conducting manner and partially protrudes out of the laminated core, so that the capillary has a cold end, arranged outside the laminated core, and a warm end, arranged within the laminated core,
   wherein the cooling fluid and the degree of filling of the capillary with the cooling fluid are chosen such that, during the operation of the electrical machine, an introduction of heat from the laminated core into the capillary leads to an evaporation of the cooling fluid, and the cold end of the capillary can be cooled such that the vapor occurring during the evaporation condenses and the heat introduced into the capillary can be removed from the capillary,
   wherein the degree of filling of the capillary with the cooling fluid is chosen such that the molar volume of the cooling fluid in the capillary is substantially the critical molar volume.

2. The electrical machine as claimed in claim 1,
   wherein the cooling fluid and the material of the capillary are chosen such that the adhesion between the capillary and the cooling fluid is greater than the cohesion of the cooling fluid,
   wherein the capillary is made so thin that a circulatory flow of the cooling fluid establishes itself in the capillary during the operation of the electrical machine irrespective of any influence of gravitational force, and
   wherein the circulatory flow is formed such that on the inner side of the capillary there forms a film of liquid, which moves substantially from the cold end to the warm end, and, enclosed by the film, the vapor moves substantially from the warm end to the cold end.

3. The electrical machine as claimed in claim 2,
   wherein the inside diameter of the capillary is from 1 mm to 5 mm.

4. The electrical machine as claimed in claim 1,
   wherein the cooling device has a liquid cooling, by means of which the cold end of the capillary can be cooled.

5. The electrical machine as claimed in claim 4,
   wherein the liquid cooling comprises a water cooling.

6. The electrical machine as claimed in claim 1,
   wherein the cooling device has a cooling rib, by means of which the cold end of the capillary can be cooled.

7. The electrical machine as claimed in claim 1,
   wherein the laminated core has grooves, which are arranged next to one another in the circumferential direction and in which electrical conductors are incorporated, and the warm end of the capillary is arranged between two adjacent grooves.

8. The electrical machine as claimed in claim 1,
   wherein the cooling fluid is water, an alcohol, and/or an alkane.

9. The electrical machine as claimed in claim 8,
   wherein the alcohol comprises methanol, ethanol, propanol and/or butanol.

10. The electrical machine as claimed in claim 8,
    wherein the alkane comprises propane, butane, pentane, hexane and/or heptane.

11. The electrical machine as claimed in claim 1, further comprising:
    a plurality of capillaries distributed over the laminated core uniformly over the circumference and in the axial direction.

* * * * *